US012669429B2

(12) United States Patent 
Yang et al.

(10) Patent No.: US 12,669,429 B2 
(45) Date of Patent: Jun. 30, 2026

(54) TESTING SYSTEM AND TESTING METHOD FOR SUPERCRITICAL CARBON DIOXIDE CONTINUOUS FLOW CORROSION

(71) Applicant: CHINA INSTITUTE OF ATOMIC ENERGY, Beijing (CN)

(72) Inventors: Wanhuan Yang, Beijing (CN); Pengrui Qiao, Beijing (CN); Xueli Zhao, Beijing (CN); Jingchun Wang, Beijing (CN); Peng Zhang, Beijing (CN); Xueting Gong, Beijing (CN); Han Cao, Beijing (CN); Wen Yang, Beijing (CN); Qingfu Zhu, Beijing (CN); Weihua Zhong, Beijing (CN)

(73) Assignee: CHINA INSTITUTE OF ATOMIC ENERGY, Beijing (CN)

( * ) Notice: Subject to any disclaimer, the term of this patent is extended or adjusted under 35 U.S.C. 154(b) by 320 days.

(21) Appl. No.: 18/697,429

(22) PCT Filed: Jan. 19, 2024

(86) PCT No.: PCT/CN2024/073372 
§ 371 (c)(1), 
(2) Date: Mar. 29, 2024

(87) PCT Pub. No.: WO2025/055242 
PCT Pub. Date: Mar. 20, 2025

(65) Prior Publication Data 
US 2026/0153429 A1     Jun. 4, 2026

(30) Foreign Application Priority Data

Sep. 15, 2023    (CN) .......................... 202311196857.0

(51) Int. Cl. 
*G01N 17/00*          (2006.01)

(52) U.S. Cl. 
CPC ................................... *G01N 17/002* (2013.01)

(58) Field of Classification Search 
CPC .................................................... G01N 17/002 
See application file for complete search history.

(56) References Cited

U.S. PATENT DOCUMENTS 8,142,745 B2 *   3/2012   Reyes .................. B01D 53/228 
                                                        423/220 
2022/0307973 A1 *   9/2022   Xiao .................. G01N 21/3504

* cited by examiner

*Primary Examiner* — Eric S. McCall 
(74) *Attorney, Agent, or Firm* — Kinney & Lange, P.A.

(57)          ABSTRACT

Provided are a testing system and a testing method for supercritical carbon dioxide continuous flow corrosion. The testing system includes a gas supply system and a closed-loop testing system loop. The testing system loop includes: a circulation pump providing a power of boosting and flowing for a circulation of liquid carbon dioxide in the testing system loop; a flow meter used to measure a flow rate of the liquid carbon dioxide; a heater used to transform the liquid carbon dioxide into a carbon dioxide gas; a test section used for storing a sample and performing a continuous corrosion test; a regenerator used to exchange heat with the tested carbon dioxide gas; a condenser used to condense the heat-exchanged carbon dioxide gas; and a circulation tank used to provide the liquid carbon dioxide for the testing system loop, recycle the liquid carbon dioxide, and form a closed-loop testing system loop.

17 Claims, 5 Drawing Sheets

TESTING SYSTEM AND TESTING METHOD FOR SUPERCRITICAL CARBON DIOXIDE CONTINUOUS FLOW CORROSION

CROSS REFERENCE TO RELATED APPLICATION(S)

This application is a National Stage Application of International Application No. PCT/CN 2024/073372, filed on Jan. 19, 2024, entitled "TESTING SYSTEM AND TESTING METHOD FOR SUPERCRITICAL CARBON DIOXIDE CONTINUOUS FLOW CORROSION", which claims priority to Chinese Patent Application No. 202311196857.0, filed on Sep. 15, 2023, the entire contents of which are incorporated herein in their entireties by reference.

TECHNICAL FIELD

The present disclosure relates to a field of metal material corrosion and protection technology, and in particular, to a testing system and a testing method for supercritical carbon dioxide continuous flow corrosion.

BACKGROUND

Supercritical carbon dioxide is a relatively dense fluid that combines gas and liquid properties, and has characteristics such as low viscosity, strong fluidity, low system circulation loss, high density, high heat transfer efficiency, and strong work performance. Related researches have shown that when the pressure of the supercritical carbon dioxide is 20 MPa and the temperature reaches to 550° C., the efficiency of converting thermal energy into output electrical energy in the power generation system may generally reach over 45%, while the efficiency of Rankine cycle using water as the circulating working fluid is generally lower than 40%. For example, when the pressure of the working fluid parameter of steam is 6 MPa to 7 MPa and the temperature is 275° C. to 285° C., the cycle efficiency of a nuclear power unit is 33%. Therefore, the Brayton cycle of supercritical carbon dioxide has enormous potential for application in next-generation nuclear power, solar power generation, gas turbine, and other forms of power generation systems.

Unlike a high temperature steam environment, an oxidation behavior and a carburization behavior of a heat-resistant material occur simultaneously in a supercritical carbon dioxide environment. The carburization behavior not only reduces the adhesion between a surface oxide layer and a matrix of the heat-resistant material, but also significantly reduces an external diffusion efficiency of Cr ions and limits a film-forming rate of $Cr_2O_3$ layer, thereby significantly reducing a corrosion resistance performance of the heat-resistant material. At present, researches have been studied on the high temperature corrosion resistance, carburization resistance and mechanical properties of ferrite, austenite, nickel-based high temperature alloy and surface-modified heat-resistant material in the supercritical carbon dioxide environment. However, due to the phenomenon of flow accelerated corrosion occurring in the high flow rate, high temperature, high pressure and supercritical environment, it is required to conduct an in-depth research on the flow accelerated corrosion test of key materials in a nuclear power system under conditions of high temperature, high pressure and supercritical carbon dioxide. The research results will provide strong guarantees for the safety and reliability of the operation of the entire nuclear power system. Due to the strong permeability of the working fluid parameter of the supercritical carbon dioxide, it is difficult for a supercritical fluid circulation pump to operate stably under high temperature and high pressure, so that it is difficult to establish a stable testing system for supercritical carbon dioxide high flow rate corrosion, leading to affect the flow accelerated corrosion test research of key materials under the conditions of high temperature, high pressure, and supercritical carbon dioxide.

SUMMARY

An embodiment of the present disclosure provides a testing system for supercritical carbon dioxide continuous flow corrosion, including a gas supply system and a closed-loop testing system loop. The testing system loop includes: a circulation tank connected to the gas supply system, wherein the circulation tank is provided with a feeding inlet and an outlet of the circulation tank, and a liquid carbon dioxide released from the gas supply system enters the circulation tank via the feeding inlet to provide the liquid carbon dioxide for the testing system loop; a circulation pump connected to the outlet of the circulation tank and configured to provide a power of boosting and flowing for a circulation of the liquid carbon dioxide; a flow meter connected to the circulation pump and configured to measure a flow rate of the liquid carbon dioxide; a heater connected to the flow meter and configured to vaporize the liquid carbon dioxide into a carbon dioxide gas; a test section provided with an inlet of the test section and an outlet of the test section, wherein the carbon dioxide gas enters the test section via the inlet of the test section, the test section is configured as a place for storing a sample to be tested and performing a continuous corrosion test, and a tested carbon dioxide gas is discharged via the outlet of the test section; a regenerator provided with a first inlet of the regenerator and a first outlet of the regenerator, wherein the tested carbon dioxide gas enters the regenerator via the first inlet of the regenerator and exchanges heat with the liquid carbon dioxide flowing into the regenerator, and a heat-exchanged carbon dioxide gas is discharged via the first outlet of the regenerator; a condenser provided with an inlet of the condenser and an outlet of the condenser, wherein the inlet of the condenser is connected to the first outlet of the regenerator, so that the heat-exchanged carbon dioxide gas enters the condenser for condensation, and a condensed liquid carbon dioxide is discharged via the outlet of the condenser; wherein the circulation tank is further provided with an inlet of the circulation tank, and the liquid carbon dioxide discharged from the outlet of the condenser enters the circulation tank via the inlet of the circulation tank, so as to achieve a recycling of the liquid carbon dioxide and form the closed-loop testing system loop.

An embodiment of the present disclosure further provides a testing method for supercritical carbon dioxide continuous flow corrosion, in which the testing system in the above embodiment is used. The method includes: transporting a liquid carbon dioxide released from the gas supply system into the circulation pump via the circulation tank; boosting a pressure of the liquid carbon dioxide to a first pressure by the circulation pump, wherein a part of a boosted liquid carbon dioxide flows into the flow meter; opening an outlet of the flow meter, so that a part of the liquid carbon dioxide in the flow meter flows into the heater; heating the liquid carbon dioxide to a predetermined temperature by the heater, so that the liquid carbon dioxide is transformed into the carbon dioxide gas; performing a continuous flow corrosion test on the carbon dioxide gas flowing into the test section, wherein the tested carbon dioxide gas is discharged via the outlet of the test section; performing a heat exchanging on the tested carbon dioxide gas flowing into the regenerator, so as to obtain the heat-exchanged carbon dioxide gas; and condensing the heat-exchanged carbon dioxide gas via the condenser, so as to obtain the liquid carbon dioxide, wherein the liquid carbon dioxide flows into the circulation tank for recycling.

DESCRIPTION FOR REFERENCE NUMBERS

Figure 1:
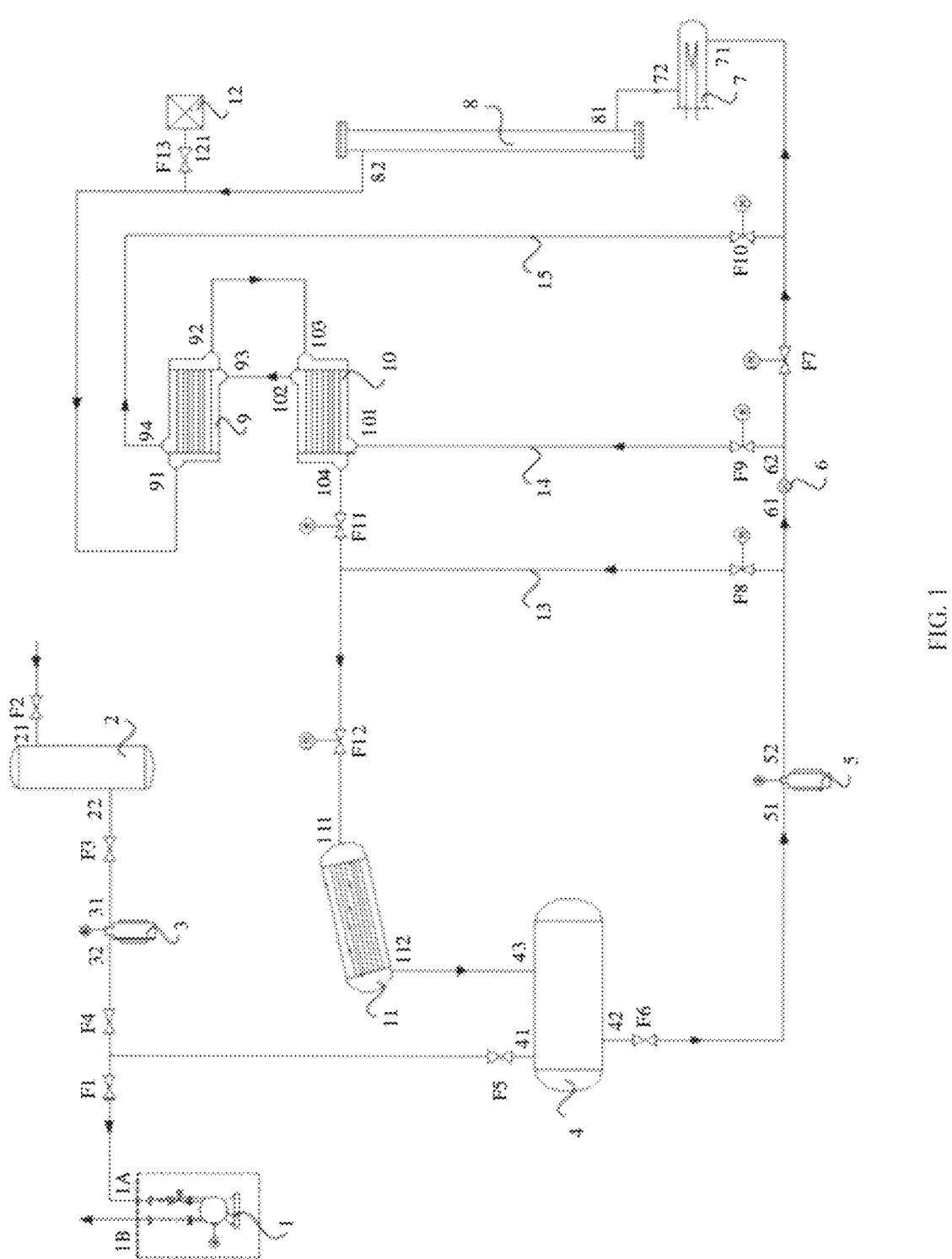
FIG. 1 is a schematic diagram of a testing system for supercritical carbon dioxide continuous flow corrosion in an embodiment of the present disclosure.

1—Vacuum pump, 2—Raw material tank, 3—Booster pump, 4—Circulation tank, 5—Circulation pump, 6—Flow meter, 7—Heater, 8—Test section, 9—First-stage regenerator, 10—Second-stage regenerator, 11—Condenser, 12—Mass spectrometer, 13—First bypass, 14—Second bypass, 15—Third bypass; 1A—Inlet of the vacuum pump, 1B—Outlet of the vacuum pump, 21—Raw material inlet, 22—Raw material outlet, 31—Inlet of the booster pump, 32—Outlet of the booster pump, 41—Feeding inlet, 42—Outlet of the circulation tank, 43—Inlet of the circulation tank, 51—Inlet of the circulation pump, 52—Outlet of the circulation pump, 61—Inlet of the flow meter, 62—Outlet of the flow meter, 71—Inlet of the heater, 72—Outlet of the heater, 81—Inlet of the test section, 82—Outlet of the test section, 91—First inlet of the first-stage regenerator, 92—First outlet of the first-stage regenerator, 93—Second inlet of the first-stage regenerator, 94—Second outlet of the first-stage regenerator, 101—Second inlet of the second-stage regenerator, 102—Second outlet of the second-stage regenerator, 103—First inlet of the second-stage regenerator, 104—First outlet of the second-stage regenerator, 111—Inlet of the condenser, 112—Outlet of the condenser, 121—Inlet of the mass spectrometer; 200—Sample to be tested; 50—Fastener; 60—Intake pipe section, 601—Sealing element;

70—Detachable section, 700—Bending pipe section, 701—Sealing element; 80—Test pipe section, 801—Sealing element, 8011—Flange, 8012—Welding lip; 83—Buffering element, 831—Fixing element, 832—Connecting element; 84—Sample holder, 840—Clamping element, 8401—Slot body, 8402—Clamping slot, 8403—Mounting hole, 8404—Connecting portion, 8405—Connecting hole; F1—First valve, F2—Second valve, F3—Third valve, F4—Fourth valve, F5—Fifth valve, F6—Sixth valve, F7—Seventh valve, F8—Eighth valve, F9—Ninth valve, F10—Tenth valve, F11—Eleventh valve, F12—Twelfth valve, and F13—Thirteenth valve.

DETAILED DESCRIPTION OF EMBODIMENTS

In order to make the purposes, technical solutions, and advantages of the present disclosure clearer, the following will provide a clear and complete description of the technical solution of the present disclosure with reference to the accompanying drawings of embodiments of the present disclosure. Obviously, the described embodiments are representative embodiments of the present disclosure, rather than all embodiments. Based on the described embodiments of the present disclosure, all other embodiments obtained by those of ordinary skill in the art without the requirements for creative labor fall within the scope of protection of the present disclosure.

It should be noted that, unless otherwise defined, the technical or scientific terms used in the present disclosure shall have the general meaning understood by individuals with general skills in the art to which the present disclosure belongs. If the entire text involves descriptions such as "first" and "second", these descriptions such as "first" and "second" are only used to distinguish similar objects and may not be understood as indicating or implying their relative importance, order, or implying the quantity of technical features indicated. It should be understood that the data described in "first" and "second" may be interchanged in appropriate circumstances. If "and/or" appears in the entire text, it means including three parallel schemes. Taking "A and/or B" as an example, it includes scheme A, scheme B, or a scheme in which both A and B satisfy.

FIG. 1 is a schematic diagram of a testing system for supercritical carbon dioxide continuous flow corrosion in an embodiment of the present disclosure.

A testing system for supercritical carbon dioxide continuous flow corrosion provided by an embodiment of the present disclosure, as shown in FIG. 1, includes a circulation tank 4, a circulation pump 5, a flow meter 6, a heater 7, a test section 8, a regenerator, and a condenser 11.

Specifically, the circulation tank 4 is connected to a gas supply system. One end of the circulation tank 4 is provided with a feeding inlet 41, and the other end of the circulation tank 4 is provided with an outlet 42 of the circulation tank. A liquid carbon dioxide released from the gas supply system enters the circulation tank 4 via the feeding inlet 41 to provide the liquid carbon dioxide for the testing system loop. The circulation pump 5 is connected to the circulation tank 4 and used to provide a power of boosting and flowing for a circulation of the liquid carbon dioxide. The flow meter 6 is connected to the circulation pump 5 and used to measure a flow rate of the liquid carbon dioxide. One end of the heater 7 is connected to the flow meter 6, and the other end of the heater 7 is connected to the test section 8. The heater 7 is used to vaporize the liquid carbon dioxide into a carbon dioxide gas. The test section 8 is provided with an inlet 81 of the test section and an outlet 82 of the test section. The carbon dioxide gas enters the test section 8 via the inlet 81 of the test section. The test section 8 is used as a place for storing a sample 200 to be tested and performing a continuous corrosion test. The tested carbon dioxide gas (i.e. the carbon dioxide gas in the test section 8 after passing through the sample 200 to be tested) is discharged via the outlet 82 of the test section. The regenerator is provided with a first inlet of the regenerator and a first outlet of the regenerator. The tested carbon dioxide gas enters the regenerator via the first inlet of the regenerator and exchanges heat with the liquid carbon dioxide flowing into the regenerator. The heat-exchanged carbon dioxide gas is discharged via the first outlet of the regenerator. The liquid carbon dioxide flowing from the circulation tank 4 may first exchange heat with the carbon dioxide gas in the regenerator and then enter the heater 7 to be heated and vaporized into the carbon dioxide gas. The condenser 11 is provided with an inlet 111 of the condenser and an outlet 112 of the condenser. The inlet 111 of the condenser is connected to the first outlet of the regenerator, so that the heat-exchanged carbon dioxide gas enters the condenser 11 for condensation. The condensed liquid carbon dioxide is discharged via the outlet 112 of the condenser. One end of the circulation tank 4 is further provided with an inlet 43 of the circulation tank. The liquid carbon dioxide discharged from the outlet 112 of the condenser enters the circulation tank 4 via the inlet 43 of the circulation tank, so as to achieve a recycling of the liquid carbon dioxide and form a closed-loop testing system loop.

In an embodiment of the present disclosure, a testing system with an adjustable flow rate may be obtained by establishing a stable high pressure environment using a circulation pump, establishing a stable high temperature environment using a heater with variable temperature and variable power, and measuring the flow rate in the testing system loop using a flow meter. The energy consumption of the testing system may be reduced by using the liquid carbon dioxide in the regenerator to cool the tested carbon dioxide gas, so as to achieve the purpose of energy saving. Then, zero carbon dioxide emission is achieved by using a condenser to convert the cooled carbon dioxide gas into the liquid carbon dioxide and recycle the liquid carbon dioxide into a circulation tank. On this basis, a closed-loop testing system and method for supercritical carbon dioxide continuous flow corrosion under high temperature and high pressure with controllable flow rate and variable temperature are constructed.

According to some embodiments of the present disclosure, as shown in FIG. 1, the gas supply system includes: a raw material tank 2 and a booster pump 3. The raw material tank 2 is used to store a liquid carbon dioxide raw material. The raw material tank 2 is provided with a raw material inlet 21 and a raw material outlet 22. The raw material inlet 21 is connected to a pipeline of a tank car, and a second valve F2 is provided on the connected pipeline. The second valve F2 is used to control a flow rate of the liquid carbon dioxide in the tank car into the raw material tank 2. The tank car is used to provide the liquid carbon dioxide. Therefore, when the raw material tank 2 is connected to the tank car, the raw material tank 2 is further used to buffer and collect carbon dioxide. The booster pump 3 is provided with an inlet 31 of the booster pump and an outlet 32 of the booster pump. The inlet 31 of the booster pump is connected to the raw material outlet 22, and the connection method includes a pipeline. A third valve F3 is further provided on the pipeline connecting the inlet 31 of the booster pump and the raw material outlet 22. The third valve F3 is used to control a flow rate of a liquid carbon dioxide released from the raw material tank 2 into the booster pump 3. The booster pump 3 is configured to boost the liquid carbon dioxide discharged from the raw material tank 2 and transport the boosted liquid carbon dioxide to the circulation tank 4 via the outlet 32 of the booster pump.

According to some embodiments of the present disclosure, as shown in FIG. 1, the testing system further includes a vacuum pump 1. The vacuum pump 1 is provided with an inlet 1A of the vacuum pump and an outlet 1B of the vacuum pump. One end of the inlet 1A of the vacuum pump is connected to the outlet 32 of the booster pump. The vacuum pump 1 is configured to perform an airtightness inspection on the gas supply system and extract the air from the gas supply system before the gas supply system is started. The extracted air is discharged via the outlet 1B of the vacuum pump, so as to ensure that the testing system is not affected by impurities other than the liquid carbon dioxide. The vacuum pump 1 may be connected to the booster pump 3 through a pipeline, on which a first valve F1 and a fourth valve F4 are provided. The fourth valve F4 is provided close to a side of the outlet 32 of the booster pump and is used to control a flow rate of the boosted liquid carbon dioxide released from the booster pump 3 into the circulation tank 4. The first valve F1 is provided close to a side of the inlet 1A of the vacuum pump, serving as a main valve of the testing system. Through the synergistic effect between the first valve F1 and the fourth valve F4, an airtightness security inspection for the gas supply system may be achieved by using the vacuum pump 1.

According to some embodiments of the present disclosure, as shown in FIG. 1, one end of the inlet 1A of the vacuum pump is further connected to the feeding inlet 41. The vacuum pump 1 is configured to perform an airtightness inspection on the testing system loop and extract the air from the testing system loop before the testing system loop is started. The extracted air is discharged via the outlet 1B of the vacuum pump. The connection method between the feeding inlet 41 and the pipeline connecting the vacuum pump 1 and the booster pump 3 includes a pipeline. A connection point is located between the first valve F1 and the fourth valve F4, so as to connect the vacuum pump 1, the booster pump 3 and the circulation tank 4 to each other. A fifth valve F5 is provided on the pipeline connecting the circulation tank 4, the vacuum pump 1 and the booster pump 3. The fifth valve F5 is used to control a flow rate of the boosted liquid carbon dioxide entering the circulation tank 4. Through the synergistic effect between the first valve F1 and the fifth valve F5, an airtightness security inspection for the testing system loop may be performed by using the vacuum pump 1.

According to some embodiments of the present disclosure, as shown in FIG. 1, the circulation pump 5 is provided with an inlet 51 of the circulation pump and an outlet 52 of the circulation pump. The inlet 51 of the circulation pump is connected to the outlet 42 of the circulation tank through a pipeline, and a sixth valve F6 is provided on the connected pipeline. The sixth valve F6 is used to control a flow rate of the liquid carbon dioxide released from the circulation tank 4 into the circulation pump 5. The circulation pump 5 may be a plunger pump. The circulation pump 5 is configured to provide a power of boosting and flowing for a circulation of the liquid carbon dioxide, so as to perform a frequency conversion adjustment on the pressure and flow rate of the liquid carbon dioxide. The flow meter 6 is provided with an inlet 61 of the flow meter and an outlet 62 of the flow meter. The inlet 61 of the flow meter is connected to the outlet 52 of the circulation pump to transport the boosted liquid carbon dioxide to the flow meter 6. The flow meter 6 is used to measure the flow rate of the liquid carbon dioxide, specifically to measure the flow rate of the carbon dioxide gas in the test section 8 of the testing system loop. The heater 7 is provided with an inlet 71 of the heater and an outlet 72 of the heater. The inlet 71 of the heater is connected to the outlet 62 of the flow meter to transport a part of the boosted liquid carbon dioxide to the heater 7 for heating, transforming the liquid carbon dioxide into the carbon dioxide gas. The method of connecting the flow meter 6 to the heater 7 includes a pipeline connection, and a seventh valve F7 is provided on the connected pipeline. The seventh valve F7 is used to control a flow rate of the liquid carbon dioxide into the heater 7. The test section 8 is provided with an inlet 81 of the test section and an outlet 82 of the test section, so that the carbon dioxide gas flows into the test section 8 for continuous flow corrosion testing. The inlet 81 of the test section is connected to the outlet 72 of the heater, and the connection method includes a pipeline. Through the synergistic use of the circulation pump 5 and the flow meter 6, the flow rate of the carbon dioxide gas in the test section 8 may be controlled to meet detections of sample to be tested at different flow rates. The flow rate in the test section 8 may reach to 12 m/s to 15 m/s, thereby achieving continuous flow testing with high flow rate.

According to some embodiments of the present disclosure, the testing system loop further includes a first bypass 13. One end of the first bypass 13 is connected to the pipeline between the outlet 52 of the circulation pump and the inlet 61 of the flow meter, while another end of the first bypass 13 is connected to a pipeline between the inlet 111 of the condenser and the first outlet of the regenerator, thereby forming a closed-loop of the circulation tank 4, the circulation pump 5, the first bypass 13, the condenser 11 and the circulation tank 4. A part of the liquid carbon dioxide entering the circulation pump 5 via the inlet 51 of the circulation pump enters the condenser 11 via the first bypass 13, and another part of the liquid carbon dioxide enters the flow meter 6. Furthermore, an eighth valve F8 is provided on the first bypass 13. The eighth valve F8 may adjust a flow rate of the liquid carbon dioxide returning to the condenser 11 and a flow rate of the liquid carbon dioxide in the testing system loop, thereby reducing the flow load of the flow meter 6 and preventing the testing system from unstably operating due to excessive carbon dioxide entering the test section 8.

According to an embodiment of the present disclosure, the regenerator is further provided with a second inlet of the regenerator and a second outlet of the regenerator. The testing system loop further includes a second bypass 14 and a third bypass 15. One end of the second bypass 14 is connected to the pipeline between the outlet 62 of the flow meter and the seventh valve F7, while another end of the second bypass 14 is connected to the second inlet of the regenerator. Furthermore, a ninth valve F9 is also provided on the second bypass 14. The ninth valve F9 is used to control a flow rate of the second bypass, thereby controlling the heat exchanging effect in the regenerator. One end of the third bypass 15 is connected to the second outlet of the regenerator, while another end of the third bypass 15 is connected to the inlet 71 of the heater. A tenth valve F10 is provided on the third bypass 15. The tenth valve F10 is used to control a flow rate on the third bypass and simply control the temperature in the heater 7, thereby controlling the energy consumption. In an embodiment of the present disclosure, the liquid carbon dioxide flowing from the outlet 62 of the flow meter may enter the regenerator via the second bypass 14 and exchanges heat with the carbon dioxide gas entering the regenerator via the first inlet of the regenerator. The heat-exchanged liquid carbon dioxide is discharged via the second outlet of the regenerator and enters the heater 7 via the third bypass 15. The liquid carbon dioxide flowing from the outlet 62 of the flow meter is transported to the regenerator via the second bypass 14 for heat exchanging with the carbon dioxide gas, so as to reduce the temperature of the carbon dioxide gas, thereby allowing the condenser 11 to liquefy the carbon dioxide gas into the liquid carbon dioxide subsequently, and the liquid carbon dioxide is then recovered into the circulation tank 4 for recycling. By using the third bypass 15 to transport the heat-exchanged liquid carbon dioxide from the regenerator to the heater 7, the temperature of the liquid carbon dioxide may be increased and the energy consumption of the heater 7 for heating the liquid carbon dioxide may be reduced, thereby achieving the purpose of energy-saving.

According to some embodiments of the present disclosure, there are a plurality of regenerators connected in stages, wherein the first outlet of each stage of regenerator is connected to the first inlet of a next stage of regenerator, so that the plurality of regenerators are sequentially connected in series. The number of regenerators is preferably 2 to 4. In an embodiment of the present disclosure, the temperature of the carbon dioxide gas may be effectively reduced by connecting the plurality of regenerators in series, so that the condensation treatment may be performed subsequently by the condenser 11, thereby achieving the recycling of heat exchanging energy and reducing the energy consumption of the testing system loop at the same time.

For example, the regenerator shown in FIG. 1 includes a first-stage regenerator and a second-stage regenerator. The first-stage regenerator 9 is provided with a first inlet 91 of the first-stage regenerator and a first outlet 92 of the first-stage regenerator. The second-stage regenerator 10 is provided with a first inlet 103 of the second-stage regenerator and a first outlet 104 of the second-stage regenerator. The first inlet 91 of the first-stage regenerator is connected to the outlet 82 of the test section, so that the tested carbon dioxide gas enters the first-stage regenerator 9 for first-stage heat exchanging via the first inlet 91 of the first-stage regenerator, so as to obtain the first-stage heat-exchanged carbon dioxide gas, thereby preliminarily reducing the temperature of the carbon dioxide gas. The first outlet 92 of the first-stage regenerator is connected to the first inlet 103 of the second-stage regenerator, so that the first-stage heat-exchanged carbon dioxide gas enters the second-stage regenerator 10 for second-stage heat exchanging via the first inlet 103 of the second-stage regenerator, so as to obtain a second-stage heat-exchanged carbon dioxide gas, thereby further reducing the temperature of the carbon dioxide gas. The second-stage heat-exchanged carbon dioxide gas is discharged via a first outlet 104 of the second-stage regenerator and enters the condenser 11 for liquefaction, so that the carbon dioxide gas is transformed into the liquid carbon dioxide.

According to some embodiments of the present disclosure, the first-stage regenerator 9 is further provided with a second inlet 93 of the first-stage regenerator and a second outlet 94 of the first-stage regenerator. The second-stage regenerator 10 is further provided with a second inlet 101 of the second-stage regenerator and a second outlet 102 of the second-stage regenerator. The second inlet 101 of the second-stage regenerator is connected to the outlet 62 of the flow meter via the second bypass 14, so that the liquid carbon dioxide flowing from the outlet 62 of the flow meter may enter the second-stage regenerator 10, to provide a cold energy for the second-stage heat exchanging performed in the second-stage regenerator 10, thereby reducing the temperature of the carbon dioxide gas in the second-stage regenerator. The second-stage heat-exchanged liquid carbon dioxide is discharged via the second outlet 102 of the second-stage regenerator and enters the first-stage regenerator for recycling. The second outlet 102 of the second-stage regenerator is connected to the second inlet 93 of the first-stage regenerator, so that the second-stage heat-exchanged liquid carbon dioxide enters the first-stage regenerator 9, to provide a cold energy for the first-stage heat exchanging performed in the first-stage regenerator 9, thereby reducing the temperature of the carbon dioxide gas in the first-stage regenerator 9. The first-stage heat-exchanged liquid carbon dioxide is discharged via the second outlet 94 of the first-stage regenerator and flows into the heater 7, so as to reduce the energy consumption of the heater 7.

According to some embodiments of the present disclosure, a mass spectrometer 12 is connected to a pipeline connecting the outlet 82 of the test section and the first inlet of the regenerator. The mass spectrometer 12 is used to detect a purity of the tested carbon dioxide gas discharged from the outlet 82 of the test section. Furthermore, the mass spectrometer 12 is further provided with an inlet 121 of the mass spectrometer, so that the tested carbon dioxide gas may enter the mass spectrometer via the inlet 121 of the mass spectrometer. The inlet 121 of the mass spectrometer is connected to a pipeline between the outlet 82 of the test section and the first inlet of the regenerator. The connection method includes a pipeline connection, and a thirteenth valve F13 is provided on the connected pipeline to control a flow rate of the tested carbon dioxide gas entering the mass spectrometer. For example, in FIG. 1, the mass spectrometer 12 is connected to the pipeline connecting the outlet 82 of the test section and the first inlet 91 of the first-stage regenerator. In an embodiment of the present disclosure, the mass spectrometer 12 is used to perform a purity detection on the tested carbon dioxide gas. When it is detected that the purity of the carbon dioxide gas is not high, it is required to replace the liquid carbon dioxide in the testing system loop.

Figure 2:
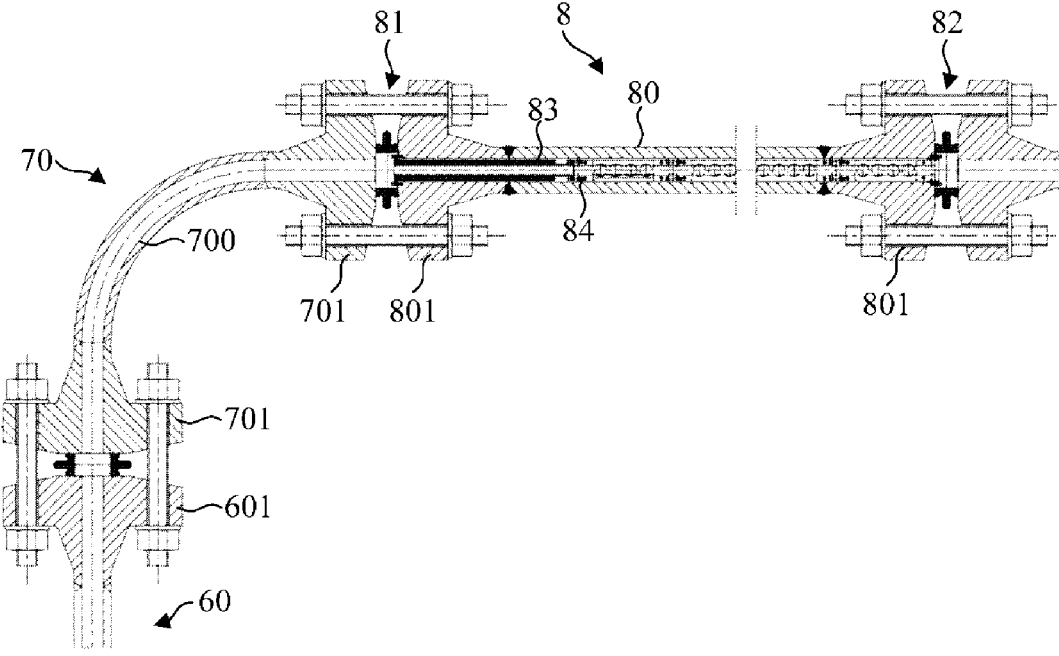
FIG. 2 is a sectional view of a connection between a test section and other pipe sections of an embodiment of the present disclosure.

With reference to FIG. 2, in some embodiments, the testing system may further include an intake pipe section 60 and an exhaust pipe section (not shown in the figure). The inlet 81 of the test section 8 is detachably connected to the intake pipe section 60. The outlet 82 of the test section 8 is detachably connected to the exhaust pipe section. The test section 8 may include a test pipe section 80 and sealing elements 801 disposed at two ends of the test pipe section 80, for sealing connection with the intake pipe section 60 and the exhaust pipe section.

The sealing element 801 has a through hole for the flow of the gas. The sealing elements 801 at two ends of the test pipe section 80 form the inlet 81 of the test section and the outlet 82 of the test section, respectively.

Figure 3:
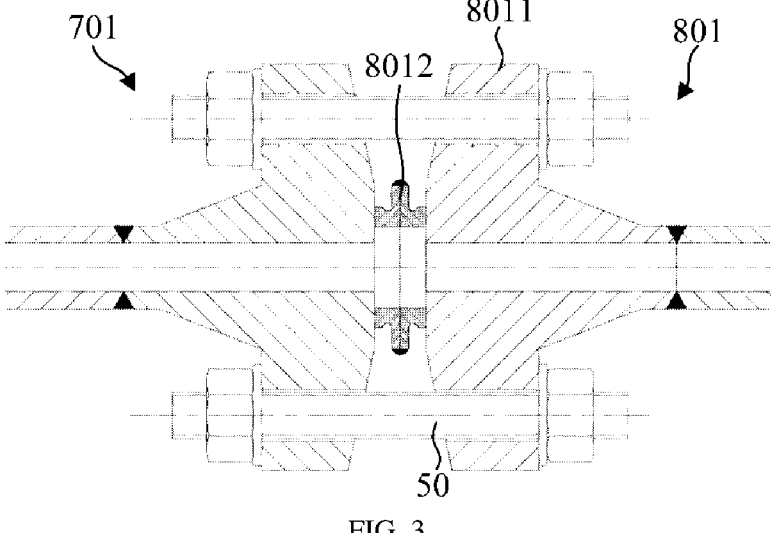
FIG. 3 is a schematic diagram of a connection between a sealing element of a test section and sealing elements of other pipe sections of an embodiment of the present disclosure.

With reference to FIG. 3, in some embodiments, the sealing element 801 may include a flange 8011 with a through hole. The flange 8011 is provided with a connecting hole. The sealing elements of other pipe sections may also include flanges correspondingly. The detachable connection of a flange between two sealing elements is achieved through the cooperation of fasteners 50 (such as bolts or studs) passing through the connecting holes and nuts.

In some embodiments, the sealing element 801 may further include a welding lip 8012. The welding lip 8012 is welded to the flange 8011. The sealing elements (such as the sealing element 601 of the intake pipe section 60 and the sealing elements of the exhaust pipe section) of other pipe sections also include welding lips correspondingly. The sealing performance within the test section 8 is ensured by a welding between two welding lips. A welding region of the welding lip is simply cut when disassembling two sealing elements. The welding region of the welding lip is re-welded when using again. In this way, it is convenient for repeated use, while the sealing performance may be ensured. By disposing the sealing elements, the test section 8 may achieve an expected test environment and meet the sealing requirements under high temperature and high pressure. For example, the test section 8 may meet the test environment with a working pressure of 30 MPa and a working temperature of 650° C.

In some embodiments, the intake pipe section 60 and the exhaust pipe section may be fixed separately. In such embodiment, when it is required to take out the sample 200 to be tested from the test section 8, the two sealing elements 801 of the test section 8 need to be separated from the intake pipe section 60 and the exhaust pipe section respectively. Then, by lifting up the test section 8, the test section 8 may expose the inlet 81 of the test section or the outlet 82 of the test section in a case that the internal sample 200 to be tested maintains to be stationary, thereby taking out the sample 200 to be tested.

With reference to FIG. 2, in some embodiments, the testing system may further include a detachable section 70. The intake pipe section 60 is connected to the test section 8 through the detachable section 70. When it is required to take out the sample 200 to be tested, the detachable section 70 may be separated from the intake pipe section 60 and the sealing element 801 of the test section 8 respectively. In a case that the test section 8 is in its original place, the sample 200 to be tested may be taken out from the test section 8 without the need of removing all test section 8 from the pipeline. Compared with the technical solution without the detachable section 70, the technical solution with the detachable section 70 may facilitate the disassembly of the sample 200 to be tested.

In some embodiments, the intake pipe section 60 is not coaxial with the test section 8. The detachable section 70 may include a bending pipe section 700 and two sealing elements 701, thereby achieving a sealing connection between the intake pipe section 60 and the test section 8, and changing a direction of the flow of the fluid to buffer the airflow. In such embodiments, a size of the detachable section 70 may be set to be relatively small, so that it is more convenient for the disassembly operation of the detachable section 70 and also beneficial for reducing the footprint of the entire testing system. The bending pipe section 700 may be, for example, a bending pipe with 90 degrees.

In some embodiments, the sealing element 701 may have the same structure as the sealing element 801 and the sealing element 601.

In some embodiments, the testing system may further include a sample holder 84 for holding the sample 200 to be tested. The sample holder 84 may be detachably disposed within the test section 8.

With reference to FIG. 4 to FIG. 7, in some embodiments, the sample holder 84 may include two clamping elements 840 opposite to each other, each of which composed of a through slot body 8401 and a plurality of pairs of clamping slots 8402. The plurality of pairs of clamping slots 8402 are spaced along a length direction of the slot body 8401. Each pair of clamping slots 8402 is disposed on two sides of the slot body 8401. Two clamping elements 840 may be detachably connected to jointly clamp the sample 200 to be tested into the clamping slot 8402 of the two clamping elements 840. The slot body 8401 is used for the passage of carbon dioxide gas along a surface of the sample 200 to be tested. When the sample holder 84 is placed in the test section 8, the carbon dioxide gas may enter the slot body 8401 and flow through the surface of the sample 200 to be tested. Since the carbon dioxide gas may flow through opposite surfaces on two sides of the sample 200 to be tested, it is more conducive to performing a uniform corrosion on the sample 200 to be tested.

The sample holder 84 of the embodiments of the present disclosure may avoid vibration of each sample 200 to be tested during a testing process, and allow as many surfaces as possible to be in a supercritical carbon dioxide environment. Moreover, the structure of the sample holder 84 of the embodiments of the present disclosure may also be used for the test section 8 with a relatively small pipe diameter (such as a pipe diameter less than or equal to 3 cm), thereby enabling to perform the test on the sample 200 to be tested under a relatively high fluid flow rate (such as 12 m/s to 15 m/s).

In some embodiments, the clamping slot 8402 may be connected to the slot body 8401. The clamping slot 8402 may match with a shape of the sample 200 to be tested, so that the sample 200 to be tested may be clamped by two clamping elements 840. In some embodiments, the sample 200 to be tested may be a circular structure. An edge of the clamping slot 8402 on a side away from the slot body 8401 may be curved.

In some embodiments, the slot body 8401 may be an arc-shaped slot to facilitate the flow of carbon dioxide gas.

Figure 5:
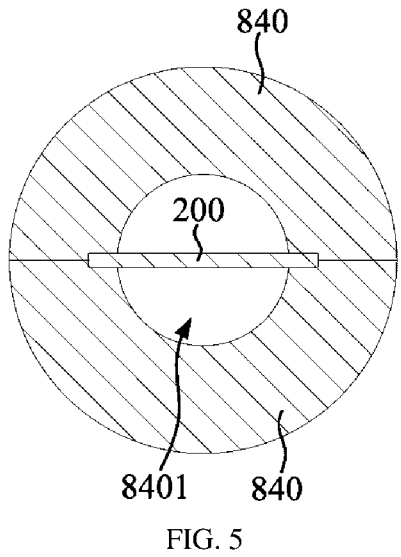
FIG. 5 is a sectional view of the sample holder shown in FIG. 4.
Figures 6, 7:
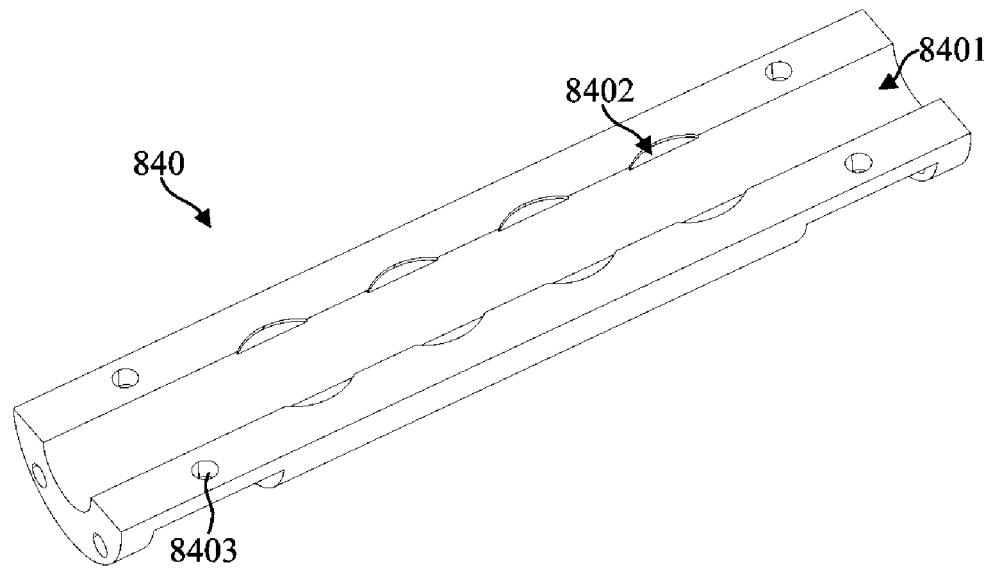
FIG. 6 is a schematic diagram of a structure of a clamping element of an embodiment of the present disclosure.
FIG. 7 is a schematic diagram of placing a sample to be tested in a clamping element of an embodiment of the present disclosure.

With reference to FIG. 5 and FIG. 6, in some embodiments, the clamping element 840 may have a circular arc structure, and two clamping elements 840 form a circular ring structure together. The two clamping elements 840 may be respectively provided with mounting holes 8403 to detachably connect the two clamping elements 840 using fasteners that pass through the mounting holes 8403. The fasteners may be, for example, bolts. The sample holder 84 of the embodiments of the present disclosure is easy to disassemble, easy to operate, and suitable for frequent sampling during the testing process.

Figure 4:
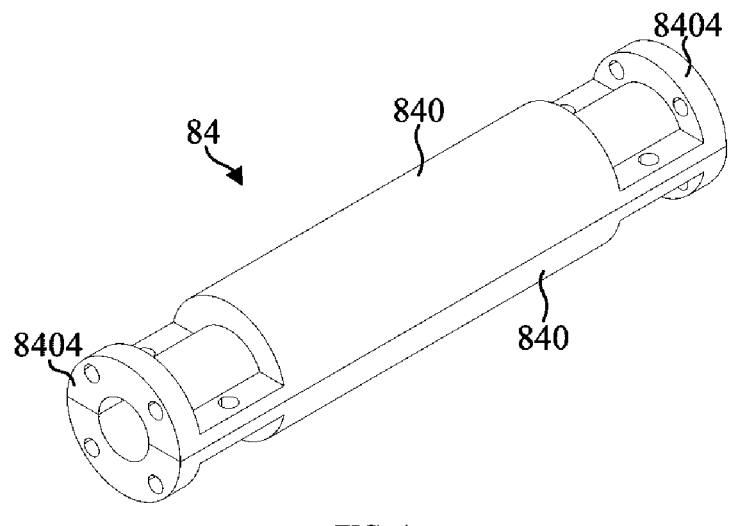
FIG. 4 is a schematic diagram of a structure of a sample holder of an embodiment of the present disclosure.

In some embodiments, the testing system may include a plurality of sample holders 84. These sample holders 84 may be detachably connected together. With reference to FIG. 4, in some embodiments, connecting portions 8404 are formed at two ends of the clamping element 840 respectively. Two adjacent clamping elements 840 are connected through their respective connecting portions 8404. The connecting portion 8404 is provided with a plurality of connecting holes 8405 to detachably connect two sample holders 84 using fasteners that pass through the connecting holes 8405. Since the sample holders 84 of the embodiments of the present disclosure may be connected to each other, it is conductive to avoiding vibration between the sample holders 84, thereby improving the accuracy of testing.

When using the testing system to perform corrosion testing on the sample 200 to be tested, a large number (such as dozens or even hundreds of pieces) of different materials of the samples 200 to be tested need to be loaded during each test. The placement method of the sample 200 to be tested in the test section 8 is a difficult point in the testing process. In the embodiments of the present disclosure, a large number of samples 200 to be tested may be arranged within the test section 8 by disposing a plurality of sample holders 84 connected to each other. For example, four samples 200 to be tested may be placed into the clamping slots 8402 of the clamping element 840, and the clamping element 840 may be covered by another clamping element 840. Four bolts may be used to connect the two clamping elements 840 to form a complete sample holder 84. When 100 samples 200 to be tested need to be placed, 25 sample holders 84 may be connected by bolts through end-to-end connection. After connection, 25 sample holders 84 may be pushed into the test section 8 from the inlet 81 of the test section 8.

Figure 8:
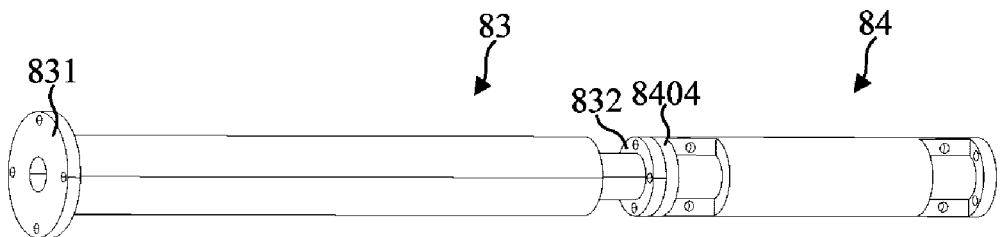
FIG. 8 is a schematic diagram of connecting a sample holder to a buffering element of an embodiment of the present disclosure.
Figure 9:
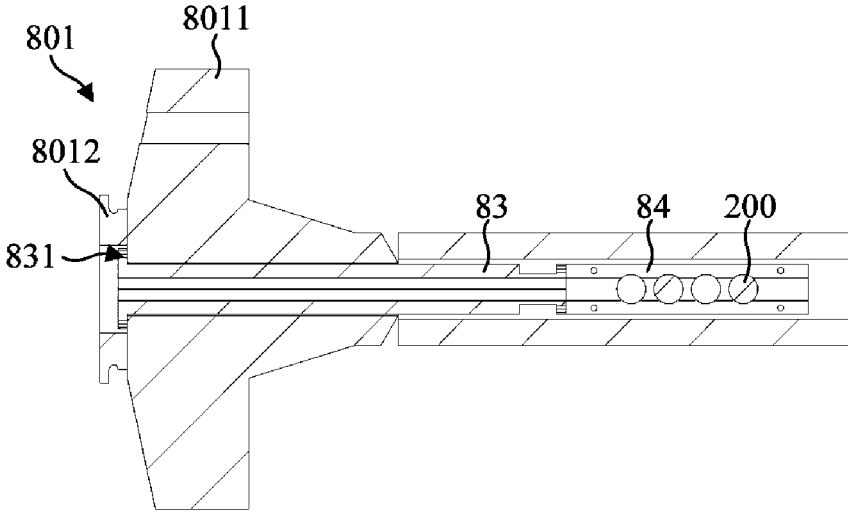
FIG. 9 is a schematic diagram of placing a sample holder and a buffering element in a test section of an embodiment of the present disclosure.

With reference to FIG. 8 and FIG. 9, in some embodiments, the testing system may include a buffering element 83. The buffering element 83 may be detachably disposed within the test section 8. The carbon dioxide gas enters the sample holder 84 through the buffering element 83. The buffering element 83 is used to reduce the impact of the carbon dioxide gas on the sample 200 to be tested.

In some embodiments, the buffering element 83 is a tubular element. An inner diameter of the buffering element 83 is substantially the same as an inner diameter of the slot body 8401 of the sample holder 84, so that when the carbon dioxide gas enters the slot body 8401 of the sample holder 84 from the buffering element 83, the flow area of the carbon dioxide gas remains substantially unchanged to stabilize the airflow.

In some embodiments, the buffering element 83 may be connected to the sample holder 84 to form a whole.

In some embodiments, the buffering element 83 may include a connecting element 832. The buffering element 83 may be detachably connected to the connecting portion 8404 of the sample holder 84 through the connecting element 832. Specifically, the connecting element 832 is provided with connecting holes. The connecting element 832 is detachably connected to the connecting portion 8404 of the sample holder 84 by bolts.

In some embodiments, the buffering element 83 further includes a fixing element 831 for detachably fixing and connecting with the sealing element 801, thereby fixing the sample holder 84 in the test section 8. After separating the sealing element 801 from the sealing element of an adjacent pipe section, the fixing element 831 is separated from the sealing element 801. Then, the buffering element 83 and the sample holders 84 connected to each other are directly taken out from the test section 8 through the fixing element 831. In the embodiments of the present disclosure, the buffering element 83 connected to the sample holder 84 is disposed, which not only reduces the impact of the carbon dioxide gas on the sample 200 to be tested, but also fixes the sample holder 84 in the test section 8, and facilitates a one-time putting the sample holders 84 into the test section 8 or a one-time taking out of the sample holders 84 from the test section 8.

In some embodiments, the size of the tubular element is smaller than the size of the through hole of the sealing element 801, while the size of the fixing element 831 is larger than the size of the through hole of the sealing element 801, thereby allowing the tubular element to enter the test pipe section 80 through the through hole of the sealing element 801, and allowing the fixing element 831 to be in contact with the sealing element 801. In this way, when the carbon dioxide gas enters the test section 8, the carbon dioxide gas may directly enter an interior of the sample holder 84 via an interior of the tubular element, and the airflow is more stable.

In some embodiments, the fixing element 831 may be a protrusion formed at one end of the tubular element. The protrusion forms a plurality of mounting holes, and correspondingly, the flange 8011 of the sealing element 801 also forms a plurality of mounting holes. The fixing element 831 is detachably connected to the flange 8011 through fasteners such as bolts.

In an embodiment of the present disclosure, a testing method for supercritical carbon dioxide continuous flow corrosion is further provided. The testing method is described in detail below in conjunction with the schematic diagram shown in FIG. 1. The testing method includes: transporting a liquid carbon dioxide released from the gas supply system into the circulation pump 5 via the circulation tank 4; boosting a pressure of the liquid carbon dioxide to a first pressure by the circulation pump 5, where a part of the boosted liquid carbon dioxide flows into the flow meter 6; the liquid carbon dioxide flowing from the flow meter 6 flows into the heater 7 via the regenerator; heating the liquid carbon dioxide to a predetermined temperature by the heater 7, so that the liquid carbon dioxide is transformed into a supercritical carbon dioxide gas; performing a continuous flow corrosion test on the supercritical carbon dioxide gas flowing into the test section 8, where the tested carbon dioxide gas is discharged via the outlet 82 of the test section; the tested carbon dioxide gas flowing into the regenerator and exchanging heat with the liquid carbon dioxide to obtain the heat-exchanged carbon dioxide gas; and condensing the heat-exchanged carbon dioxide gas via the condenser 11 to obtain the liquid carbon dioxide, where the liquid carbon dioxide flows into the circulation tank 4 for recycling.

In an embodiment of the present disclosure, in the testing system for supercritical carbon dioxide with variable flow rate, high temperature and high pressure provided in the above embodiments, using the testing method provided in the present disclosure may achieve the testing of carbon dioxide continuous flow and achieve zero emission and recycling of carbon dioxide at the same time, thereby reducing the energy consumption of the testing system loop.

According to some embodiments of the present disclosure, before loading the liquid carbon dioxide into the raw material tank 2, the third valve F3 is closed first, and the second valve F2 is opened. Then, the liquid carbon dioxide loaded by the tank car is unloaded into the raw material tank 2. When the liquid carbon dioxide reaches to a preset position in the raw material tank 2, the unloading is completed, and the second valve F2 is closed. In addition, before the continuous flow corrosion testing, the sample to be tested is placed into the test section 8, where the sample to be tested includes a metal.

According to some embodiments of the present disclosure, before introducing the liquid carbon dioxide into the testing system, the vacuum pump 1 is used to perform the airtightness inspection on the gas supply system and the testing system loop, as well as to extract the air from the gas supply system and the testing system loop.

Specifically, a water pressure test and an airtightness test are performed on the gas supply system and the testing system loop firstly. After the water pressure test and the airtightness test are passed, blowing and purification treatment are performed before vacuum pumping. Before vacuuming the gas supply system, the second valve F2 and the fifth valve F5 are closed, and the vacuum pump 1 is used to vacuum the gas supply system. The specific vacuuming sequence is: the inlet 1A of the vacuum pump, the outlet 32 of the booster pump, the booster pump 3, the inlet 31 of the booster pump, the raw material outlet 22, and the raw material tank 2. The vacuuming is completed when the pressure of the gas supply system reaches to $1*10^{-4}$ Pa to $1*10^{-5}$ Pa. At this time, the fourth valve F4 is closed, while the fifth valve F5, the sixth valve F6, the seventh valve F7, the eighth valve F8, the ninth valve F9, the tenth valve F10, the eleventh valve F11 and the twelfth valve F12 are opened in sequence, so as to vacuum the testing system loop. Specifically, the circulation tank 4, the circulation pump 5, the flow meter 6, the heater 7, the test section 8, the regenerator and the condenser 11 are vacuumed until the pressure in the testing system loop reaches to $1*10^{-4}$ Pa to $1*10^{-5}$ Pa.

According to some embodiments of the present disclosure, before the liquid carbon dioxide released from the raw material tank 2 is transported to the circulation tank 4, the booster pump 3 is used to boost the pressure of the liquid carbon dioxide to a second pressure.

Specifically, the third valve F3, the fourth valve F4, and the fifth valve F5 are opened in sequence. At the same time, the first valve F1 on the inlet 1A of the vacuum pump, the sixth valve F6 on the outlet 42 of the circulation tank, and the twelfth valve F12 on the inlet 111 of the condenser are checked to be in a closed state. The booster pump 3 is started to boost the pressure of the liquid carbon dioxide to 5.0 MPa to 6.0 MPa, to provide the power of flowing for the liquid carbon dioxide. At the same time, the liquid level in the circulation tank 4 is observed to reach a setting position, then the booster pump 3 is closed, so as to transport the liquid carbon dioxide to the circulation tank 4.

Then, the third valve F3, the fourth valve F4, the fifth valve F5, the seventh valve F7, the eleventh valve F11, and the twelfth valve F12 are closed in sequence, while the eighth valve F8, the ninth valve F9, and the tenth valve F10 are checked to be in a closed state. Then, the circulation pump 5 is started to boost the pressure of the liquid carbon dioxide released from the circulation tank 4 via the outlet 42 of the circulation tank to about 10 MPa, thereby achieving increasing the pressure of the liquid carbon dioxide by using the booster pump 5. The second pressure may be 10 MPa. At this time, the ninth valve F9 on the outlet 62 of the flow meter and the tenth valve F10 on the inlet 71 of the heater are opened and the seventh valve F7 on the inlet 71 of the heater is closed, waiting the pressure in the testing system loop to be stabilized to around 10 MPa.

After the pressure in the testing system loop is stabilized to 10 MPa, the seventh valve F7 is opened. A part of the liquid carbon dioxide released from the flow meter 6 enters the heater 7. The heater 7 is started and the temperature is gradually increased, while the frequency for adjusting the circulation pump 5 is gradually increased to gradually increase the temperature to 550° C. to 620° C., and the pressure is increased to 30 MPa to 35 MPa at the same time.

According to some embodiments of the present disclosure, after the temperature and pressure in the testing system loop are stabilized, the flow rate of the flow meter 6 is adjusted by adjusting the opening of the eighth valve F8 on the first bypass 13, so that another part of the boosted liquid carbon dioxide flows into the condenser 11 via the first bypass 13, so as to control the flow rate of the liquid carbon dioxide in the testing loop. After the flow rate of the carbon dioxide in the testing system loop meets the testing conditions, the continuous flow corrosion testing for the sample to be tested may be performed in the test section 8.

According to some embodiments of the present disclosure, the liquid carbon dioxide flows into the heater 7 and is heated by the heater 7, so that the liquid carbon dioxide may be transformed into the carbon dioxide gas. The carbon dioxide gas enters the test section 8 via the inlet 81 of the test section for continuous flow corrosion testing. The tested carbon dioxide gas is discharged via the outlet 82 of the test section and enters the regenerator for heat exchanging, thereby reducing the temperature of the carbon dioxide gas. The tested carbon dioxide gas may enter the first-stage regenerator 9 for first-stage heat exchanging, and the obtained first-stage heat-exchanged carbon dioxide gas may enter the second-stage regenerator 10 for heat exchanging, thereby further reducing the temperature of the carbon dioxide gas.

According to some embodiments of the present disclosure, a part of the liquid carbon dioxide released by the flow meter 6 enters the regenerator via the second bypass 14 and exchanges heat with the carbon dioxide gas in the regenerator. The heat-exchanged liquid carbon dioxide flows into the heater 7 for recycling.

For example, as shown in FIG. 1, a part of liquid carbon dioxide released by the flow meter 6 enters the second-stage regenerator 10 via the second bypass 14 and the second inlet 101 of the second-stage regenerator, and exchanges heat with the carbon dioxide gas in the second-stage regenerator 10, so as to reduce the temperature of the carbon dioxide gas. The second-stage heat-exchanged liquid carbon dioxide flows out via the second outlet 102 of the second-stage regenerator, flows into the first-stage regenerator 9 via the second inlet 93 of the first-stage regenerator, and exchanges heat with the carbon dioxide gas in the first-stage regenerator 9, thereby reducing the temperature of the carbon dioxide gas. The first-stage heat-exchanged liquid carbon dioxide flows into the heater 7 via the third bypass 15 and is mixed with the liquid carbon dioxide released via the outlet 62 of the flow meter and directly entering the heater 7, thereby increasing the temperature of the liquid carbon dioxide and reducing the energy consumption of the heater 7.

According to some embodiments of the present disclosure, the method provided in the present disclosure further includes: detecting a purity of the carbon dioxide gas discharged from the outlet 82 of the test section by using the mass spectrometer 12, and replacing the liquid carbon dioxide of the entire system when the purity does not meet the standard.

In the embodiments of the present disclosure, the method provided herein takes into account the use of the regenerator, such as the first-stage regenerator 9 and the second-stage regenerator 10, to recycle the heat of carbon dioxide gas, as well as the use of the condenser to condense and recycle the heat-exchanged carbon dioxide gas, so as to reduce carbon dioxide emission and recycle the recovered liquid carbon dioxide into the circulation tank, so that the entire system is a high pressure, continuous and closed circulation system. In addition, in the present disclosure, the pressure in the testing system loop is adjusted through frequency conversion using the circulation pump 5, the temperature of the test section is adjusted by achieving temperature variance and power variance of the testing system loop using the heater 7, and the flow rate of the flow meter 6 is adjusted through the opening of the eighth valve F8 on the first bypass 13, so that the entire system is ultimately in an environment of variable flow rate, high temperature and high pressure supercritical carbon dioxide closed-loop continuous high flow rate, for performing the flow corrosion test.

The detailed explanation of the present disclosure is provided above with reference to the accompanying drawings and embodiments, but the present disclosure is not limited to the aforementioned embodiments. Within the scope of knowledge possessed by those of ordinary skill in the art, various changes may be made without departing from the purpose of the present disclosure. Any content not described in detail in the present disclosure may use the related art.

What is claimed is:

1. A testing system for supercritical carbon dioxide continuous flow corrosion, comprising a gas supply system and a closed-loop testing system loop, wherein the closed-loop testing system loop comprises:

a circulation tank connected to the gas supply system, wherein the circulation tank is provided with a feeding inlet and an outlet of the circulation tank, and a liquid carbon dioxide released from the gas supply system enters the circulation tank via the feeding inlet to provide the liquid carbon dioxide for the closed-loop testing system loop;

a circulation pump connected to the outlet of the circulation tank and configured to provide a power of boosting and flowing for a circulation of the liquid carbon dioxide;

a flow meter connected to the circulation pump and configured to measure a flow rate of the liquid carbon dioxide;

a heater connected to the flow meter and configured to vaporize the liquid carbon dioxide into a carbon dioxide gas;

a test section provided with an inlet of the test section and an outlet of the test section, wherein the carbon dioxide gas enters the test section via the inlet of the test section, the test section is configured as a place for storing a sample to be tested and performing a continuous corrosion test, and a tested carbon dioxide gas is discharged via the outlet of the test section;

a regenerator provided with a first inlet of the regenerator and a first outlet of the regenerator, wherein the tested carbon dioxide gas enters the regenerator via the first inlet of the regenerator and exchanges heat with the liquid carbon dioxide flowing into the regenerator, and a heat-exchanged carbon dioxide gas is discharged via the first outlet of the regenerator; and a condenser provided with an inlet of the condenser and an outlet of the condenser, wherein the inlet of the condenser is connected to the first outlet of the regenerator, so that the heat-exchanged carbon dioxide gas enters the condenser for condensation, and a condensed liquid carbon dioxide is discharged via the outlet of the condenser;

wherein the circulation tank is further provided with an inlet of the circulation tank, and the liquid carbon dioxide discharged from the outlet of the condenser enters the circulation tank via the inlet of the circulation tank, so as to achieve a recycling of the liquid carbon dioxide and form the closed-loop testing system loop.

2. The testing system of claim 1, wherein the regenerator is further provided with a second inlet of the regenerator and a second outlet of the regenerator, and the closed-loop testing system loop further comprises a second bypass and a third bypass;

wherein a first end of the second bypass is connected to an outlet of the flow meter, a second end of the second bypass is connected to the inlet of the regenerator, a first end of the third bypass is connected to the second outlet of the regenerator, and a second end of the third bypass is connected to an inlet of the heater; and wherein the liquid carbon dioxide enters the flow meter via an inlet of the flow meter, a part of the liquid carbon dioxide released from the outlet of the flow meter enters the regenerator via the second bypass and exchanges heat with the carbon dioxide gas entering the regenerator, and a heat-exchanged liquid carbon dioxide is discharged via the second outlet of the regenerator and enters the heater via the third bypass.

3. The testing system of claim 1, wherein a mass spectrometer is connected to a pipeline connecting the outlet of the test section and the first inlet of the regenerator, and the mass spectrometer is configured to detect a purity of the tested carbon dioxide gas discharged from the outlet of the test section.

4. The testing system of claim 1, wherein the closed-loop testing system loop comprises a plurality of regenerators connected in stages, wherein the first outlet of each stage of regenerator is connected to the first inlet of a next stage of regenerator, so that the plurality of regenerators are sequentially connected in series.

5. The testing system of claim 4, wherein the regenerator comprises a first-stage regenerator and a second-stage regenerator, the first-stage regenerator is provided with a first inlet of the first-stage regenerator and a first outlet of the first-stage regenerator, and the second-stage regenerator is provided with a first inlet of the second-stage regenerator and a first outlet of the second-stage regenerator;

wherein the first inlet of the first-stage regenerator is connected to the outlet of the test section, so that the tested carbon dioxide gas enters the first-stage regenerator via the first inlet of the first-stage regenerator for first-stage heat exchanging, to obtain a first-stage heat-exchanged carbon dioxide gas;

wherein the first outlet of the first-stage regenerator is connected to the first inlet of the second-stage regenerator, so that the first-stage heat-exchanged carbon dioxide gas enters the second-stage regenerator via the first inlet of the second-stage regenerator for second-stage heat exchanging to obtain a second-stage heat-exchanged carbon dioxide gas, and the second-stage heat-exchanged carbon dioxide gas is discharged via the first outlet of the second-stage regenerator and enters the condenser.

6. The testing system of claim 5, wherein the first-stage regenerator is further provided with a second inlet of the first-stage regenerator and a second outlet of the first-stage regenerator, and the second-stage regenerator is further provided with a second inlet of the second-stage regenerator and a second outlet of the second-stage regenerator;

wherein the second inlet of the second-stage regenerator is connected to an outlet of the flow meter through a second bypass, so that a part of the liquid carbon dioxide released from the outlet of the flow meter enters the second-stage regenerator to provide a cold energy for the second-stage heat exchanging performed in the second-stage regenerator, and a second-stage heat-exchanged liquid carbon dioxide is discharged via the second outlet of the second-stage regenerator;

wherein the second outlet of the second-stage regenerator is connected to the second inlet of the first-stage regenerator, so that the second-stage heat-exchanged liquid carbon dioxide enters the first-stage regenerator to provide a cold energy for the first-stage heat exchanging performed in the first-stage regenerator, and a first-stage heat-exchanged liquid carbon dioxide is discharged via the second outlet of the first-stage regenerator and flows into the heater.

7. The testing system of claim 1, wherein the gas supply system comprises a raw material tank configured to store a liquid carbon dioxide raw material, and the raw material tank is provided with a raw material inlet and a raw material outlet.

8. The testing system of claim 7, wherein the gas supply system further comprises a booster pump;

wherein the booster pump is provided with an inlet of the booster pump and an outlet of the booster pump, the inlet of the booster pump is connected to the raw material outlet, and the booster pump is configured to boost the liquid carbon dioxide discharged from the raw material tank and transport a boosted liquid carbon dioxide into the circulation tank via the outlet of the booster pump.

9. The testing system of claim 8, further comprising a vacuum pump;

wherein the vacuum pump is provided with an inlet of the vacuum pump and an outlet of the vacuum pump, the inlet of the vacuum pump is connected to the outlet of the booster pump, the vacuum pump is configured to perform an airtightness inspection on the gas supply system and extract an air from the gas supply system before the gas supply system is started, and an extracted air is discharged via the outlet of the vacuum pump.

10. The testing system of claim 9, wherein the inlet of the vacuum pump is further connected to the feeding inlet, the vacuum pump is configured to perform an airtightness inspection on the closed-loop testing system loop and extract an air from the closed-loop testing system loop before the closed-loop testing system loop is started, and an extracted air is discharged via the outlet of the vacuum pump.

11. The testing system of claim 10, wherein the circulation pump is provided with an inlet of the circulation pump and an outlet of the circulation pump, and the flow meter is provided with an inlet of the flow meter and an outlet of the flow meter;

wherein the closed-loop testing system loop further comprises:

a first bypass, wherein a first end of the first bypass is connected to a pipeline between the outlet of the circulation pump and the inlet of the flow meter, and a second end of the first bypass is connected to a pipeline between the inlet of the condenser and the first outlet of the regenerator;

wherein a part of the liquid carbon dioxide entering the circulation pump via the inlet of the circulation pump enters the condenser via the first bypass, so as to adjust the flow rate of the liquid carbon dioxide in the closed-loop testing system loop.

12. A testing method for supercritical carbon dioxide continuous flow corrosion, using the testing system of claim 1, comprising:

transporting a liquid carbon dioxide released from the gas supply system into the circulation pump via the circulation tank;

boosting a pressure of the liquid carbon dioxide to a first pressure by the circulation pump, wherein a first part of a boosted liquid carbon dioxide flows into the flow meter;

opening an outlet of the flow meter, so that a first part of the liquid carbon dioxide in the flow meter flows into the heater;

heating the liquid carbon dioxide to a predetermined temperature by the heater, so that the liquid carbon dioxide is transformed into the carbon dioxide gas;

performing a continuous flow corrosion test on the carbon dioxide gas flowing into the test section, wherein the tested carbon dioxide gas is discharged via the outlet of the test section;

performing a heat exchanging on the tested carbon dioxide gas flowing into the regenerator, so as to obtain the heat-exchanged carbon dioxide gas; and condensing the heat-exchanged carbon dioxide gas via the condenser, so as to obtain the liquid carbon dioxide, wherein the liquid carbon dioxide flows into the circulation tank for recycling.

13. The method of claim 12, wherein a second part of the boosted liquid carbon dioxide flows into the condenser via the first bypass, so as to control the flow rate of the liquid carbon dioxide in the testing loop.

14. The method of claim 12, wherein a second part of the liquid carbon dioxide released from the flow meter enters the regenerator via the second bypass and exchanges heat with the carbon dioxide gas in the regenerator, and a heat-exchanged liquid carbon dioxide flows into the heater.

15. The method of claim 12, further comprising:

detecting a purity of the carbon dioxide gas discharged from the outlet of the test section by using a mass spectrometer.

16. The method of claim 12, further comprising: before introducing the liquid carbon dioxide into the testing system, performing an airtightness inspection on the gas supply system and the closed-loop testing system loop respectively by using a vacuum pump, and extracting an air in the gas supply system and the closed-loop testing system loop.

17. The method of claim 16, further comprising: before transporting the liquid carbon dioxide released from the raw material tank to the circulation tank, boosting the pressure of the liquid carbon dioxide to a second pressure by using a booster pump.

* * * * *